UNITED STATES PATENT OFFICE.

NATHANIEL C. EMTAGE, OF NEW ORLEANS, LOUISIANA, ASSIGNOR TO CORNELIUS J. EVERETT, OF NEW ORLEANS, LOUISIANA.

ADDITION COMPOUND FOR COFFEE.

1,384,692.     Specification of Letters Patent.     Patented July 12, 1921.

No Drawing.     Application filed August 18, 1919. Serial No. 318,370.

*To all whom it may concern:*

Be it known that I, NATHANIEL CARLTON EMTAGE, a subject of the King of Great Britain, residing at New Orleans, in the parish of Orleans and State of Louisiana, have invented new and useful Improvements in Addition Compound for Coffee, of which the following is a specification.

This invention relates to an addition compound for coffee and contemplates both the method of producing the same and the compound *per se*. The object of the invention is to produce and provide a readily handled wholesome additional compound for ordinary coffee to develop the strength and flavor of the latter with economy in the use of coffee and also to add a rich color and body to the coffee infusion.

It is well known that many consumers of coffee prefer a combination of coffee and chicory rather than coffee alone, but owing to the scarcity of chicory, which has existed for some time, it has become necessary to provide for a substance or composition that will replace chicory and give to a coffee infusion practically the same characteristics in flavor and body to satisfy the tastes of certain consumers. The improved addition compound is to be considered in no sense a coffee substitute for the reason that it is used in certain proportions with genuine coffee infusions and whereby also certain grades of coffee may be given a better flavor and body consistency and color and at the same time the improved addition compound imparts material food values to the coffee infusion.

The improved compound consists of cane molasses 50%, raw corn meal 30%, and coffee 20%. Instead of corn meal other cereal products may be used, such as wheat.

The method pursued in preparing the compound is first to boil the molasses to a massecuite consistency of a bitter sweet taste and reduce the same to a syrup by the addition of water and subjected to a reboiling action. The corn meal or other cereal meal and coffee which has been roasted and ground are thoroughly mixed and this mixture is added to the molasses as above treated at the boiling point. The mass is then placed in a covered receptacle for about twelve hours and allowed to cook slowly by its own heat. After this slow cooking step the mass is then placed in sheet iron or other suitable metal pans and baked in an oven for twelve hours and then allowed to cool in the oven in which it was baked for a period of twelve hours. After the baked mass is cooled, it is ground and packed for delivery or use.

In the use of the improved addition compound, a certain quantity thereof, in accordance with the taste of the user, is added to a genuine coffee infusion to become thoroughly embodied with the latter and with the result that more body and a richer color is given to the coffee, and with the advantage that the amount of caffeine is materially reduced in the coffee infusion. The improved compound will not deteriorate with age and it has been found to retain its original quality indefinitely with care without the use of any form of preservative. It has also been observed that the improved compound embodies medicinal qualities, being slightly aperient and anti-flatulent. Moreover, a wholesome and nourishing beverage is produced by the use of the addition compound with genuine coffee infusion and economy in the use of genuine coffee results with a consequent reduction in the cost of coffee beverages.

What is claimed is:—

1. A method of producing a coffee addition or substitute for chicory for mixing with genuine coffee, consisting of boiling molasses to a massecuite consistency of a bitter sweet taste and reducing the same to a syrup by the addition of water and then reboiling the syrup, mixing a ground cereal and pure ground roasted coffee and adding the molasses syrup as preliminarily prepared thereto at the boiling point, placing the mass in covered means and permitting it to cook slowly by its own heat, then baking the mass in an oven and permitting it to cool off in the same oven, and finally grinding and packing the cooled mass.

2. The herein described coffee addition compound to serve as a substitute for chicory, consisting of a mixture of molasses having a bitter sweet taste, ground cereal and pure roasted coffee.

3. The herein described dry addition compound for service as a substitute for chicory and for mixture with pure roasted coffee, consisting of molasses characterized by having been boiled to massecuite consistency of a bitter sweet taste and reduced to a syrup, raw corn meal and pure ground roasted coffee thoroughly intermixed.

4. The herein described coffee addition compound to serve as a substitute for chicory and for mixture with pure roasted coffee, consisting of molasses massecuite having a bitter sweet taste 50%, corn meal 30%, and pure roasted coffee 20%.

In testimony whereof I have hereunto set my hand in presence of two subscribing witnesses.

NATHANIEL C. EMTAGE.

Witnesses:
BENJAMIN W. DART,
HENRY P, DART, Jr.